United States Patent
Wode et al.

(10) Patent No.: US 6,173,946 B1
(45) Date of Patent: Jan. 16, 2001

(54) AIR SPRING SYSTEM

(75) Inventors: Stefan Wode, Langenhagen; Gerhard Thurow, Garbsen; Bernhard Kirsten, Hannover; Joachim Jeischik, Wennigsen, all of (DE)

(73) Assignee: Continental Aktiengesellschaft, Hannover (DE)

( * ) Notice: Under 35 U.S.C. 154(b), the term of this patent shall be extended for 0 days.

(21) Appl. No.: 09/168,893

(22) Filed: Oct. 9, 1998

(30) Foreign Application Priority Data

Oct. 15, 1997 (DE) .............................................. 197 45 415

(51) Int. Cl.$^7$ ....................................................... F16F 9/04
(52) U.S. Cl. ................................ 267/64.19; 280/124.162
(58) Field of Search .................................. 267/122, 64.19, 267/64.21, 64.23, 64.24, 64.27; 280/124.157, 124.158, 124.162, 124.163, 678, 683

(56) References Cited

U.S. PATENT DOCUMENTS 4,386,791 * 6/1983 Watanabe ............................. 280/707
4,817,922 * 4/1989 Hovance ............................. 267/64.21
4,854,557 * 8/1989 Goshima et al. .................. 267/64.27

FOREIGN PATENT DOCUMENTS 1048165   12/1958   (DE) .

* cited by examiner

Primary Examiner—Christopher P. Schwartz
Assistant Examiner—Xuan Lan Nguyen
(74) Attorney, Agent, or Firm—Walter Ottesen

(57) ABSTRACT

The invention relates to a system having an air spring flexible member (6) which is clamped between a cover plate (4) and a rolloff piston (10). The movement of the rolloff piston (10) is pregiven by a curved path (16). The rolloff piston (10) is curved with the curvature being at least segmentwise of the same orientation as the curvature of the curved path (16). Because of the curvature of the rolloff piston (10), a lateral offset of the flexible member (6) to the cover plate (4) can be substantially avoided when the rolloff piston (10) plunges into the flexible member (6). The formation of a rolling lobe (20) having a different width over its periphery is also avoided.

6 Claims, 3 Drawing Sheets

AIR SPRING SYSTEM

FIELD OF THE INVENTION

The invention relates to a system which includes an air spring flexible member clamped between a cover plate and a rolloff piston. The rolloff piston is mounted so as to be movable relative to the cover plate of the flexible member of the air spring. The movement of the rolloff piston is predetermined through a curved path. The air spring rolls off on the rolloff piston while forming a rolling lobe during movement of the rolloff piston. The invention also relates to a rolloff piston for use in such a system.

BACKGROUND OF THE INVENTION

Modern motor vehicles already often have an air spring system which preferably is used on the rear axle because a level control is possible in a simple manner with the aid of the air spring system. The rear axle of a motor vehicle includes connecting rods having first and second ends. The connecting rods are pivotally suspended on the motor vehicle at the respective first ends thereof. The rear wheels and the rolloff pistons with the flexible members of the air springs associated therewith are arranged in the region of the respective second ends of the connecting rods. The end of the flexible member lying opposite the rolloff piston is attached to the vehicle chassis with the aid of a cover plate. During spring action, the connecting rods are pivoted about their respective suspension points on the motor vehicle so that there is a relative movement between the rear axle and the chassis of the motor vehicle. The rear axle, and therefore the rolloff pistons, move during an action of the spring along a curved path having a radius of curvature substantially pregiven by the length of the connecting rod. During the movement, the rolloff piston plunges into the flexible member assigned thereto and is then pulled out of the flexible member.

The flexible member of the air spring attempts to follow the curved path of the rolloff piston during a relative movement between the rolloff piston and the flexible member of the air spring. For this reason, a lateral offset of the flexible member of the air spring can occur relative to the cover plate with which the flexible member is attached to the chassis of the motor vehicle or a rolling lobe can form which has a non-constant width about its periphery. Stresses form within the flexible member of the air spring because of the lateral offset between the flexible member and the deck plate as well as because of the formation of a rolling lobe which has a non-constant width about its periphery. These stresses of the flexible member of the air spring shorten the service life thereof and therefore also of the air spring per se.

SUMMARY OF THE INVENTION

It is an object of the invention to provide a system wherein the rolloff piston is moved on a curved path and wherein the service life of the flexible member of the air spring is increased. It is also an object of the invention to provide a rolloff piston which can be used in a system of this kind.

The air spring system of the invention includes: a flexible member; a cover plate; a rolloff piston; clamping means for clamping the flexible member between the cover plate and the rolloff piston; means for moving the rolloff piston relative to the plate through a pregiven curved path so as to cause the flexible member to form a rolling lobe as the flexible member rolls up and down on the rolloff piston; and, the rolloff piston being curved so as to have a curvature which has the same orientation as the curvature of the path at least over a segment thereof.

The basic idea of the invention is that the curvature of the rolloff piston is adapted to the curvature of the curved path on which the rolloff piston moves. With a suitable curvature of the rolloff piston, it can be ensured that no transverse forces act on the flexible member which could lead to an offset of the flexible member relative to the cover plate or to the formation of a rolling lobe having a non-constant width over its periphery.

The advantages achieved with the invention are especially seen in that the shearing forces which operate in the flexible member are significantly reduced. For this reason, the service life of the flexible member of the air spring is considerably increased. It is further possible to manufacture the flexible member of the air spring from materials which, because of their material properties, were up to now deemed to be unsuitable for the manufacture of a greatly loaded flexible member. These materials include, for example, tensile stiff aramide yarns (Kevlar, et cetera) which bring comfort advantages. It is also possible to utilize a flexible member of an air spring with a simple configuration which, nonetheless, has the same service life as do the flexible members in conventional systems used up to now. For example, a flexible member having a reduced number of reinforcement cords can be utilized. This flexible member is correspondingly simple and can therefore be manufactured cost effectively.

A further advantage of the invention is seen in that, with the curvature of the piston, a targeted inclined position of the pressure effective surface (that is, the rolling lobe of the flexible member) can be obtained. With the aid of the targeted inclined position, other forces within the air spring module can be countered, for example, a compensation of transverse forces can be achieved.

According to a first embodiment of the invention, the center curvature line of the curvature of the rolloff piston has, at least segmentwise, the same radius of curvature as the curved path. Preferably, the center curvature line of the curvature of the rolloff piston corresponds to the curvature radius of the curved path of the rolloff piston in the region of the entire rolloff piston.

According to another feature of the invention, the curved path has a specific curvature in the start region. The end of the rolloff piston facing toward the cover plate has a curvature which is significantly less than the curvature at the start of the curved path, that is, a curvature which is opposite to the curvature at the start of the curved path. The end of the rolloff piston, which faces toward the cover plate, plunges the deepest into the flexible member of the air spring. For a curved path on which the rolloff piston is moved, this end of the rolloff piston therefore moves toward the wall of the flexible member and can possibly destroy the flexible member when coming into contact therewith. With the further embodiment, it is achieved that the end of the rolloff piston, which is assigned to the cover plate, touches the flexible member significantly later so that the rolloff piston can plunge deeper into the flexible member and therefore achieves the advantage of a free movement.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
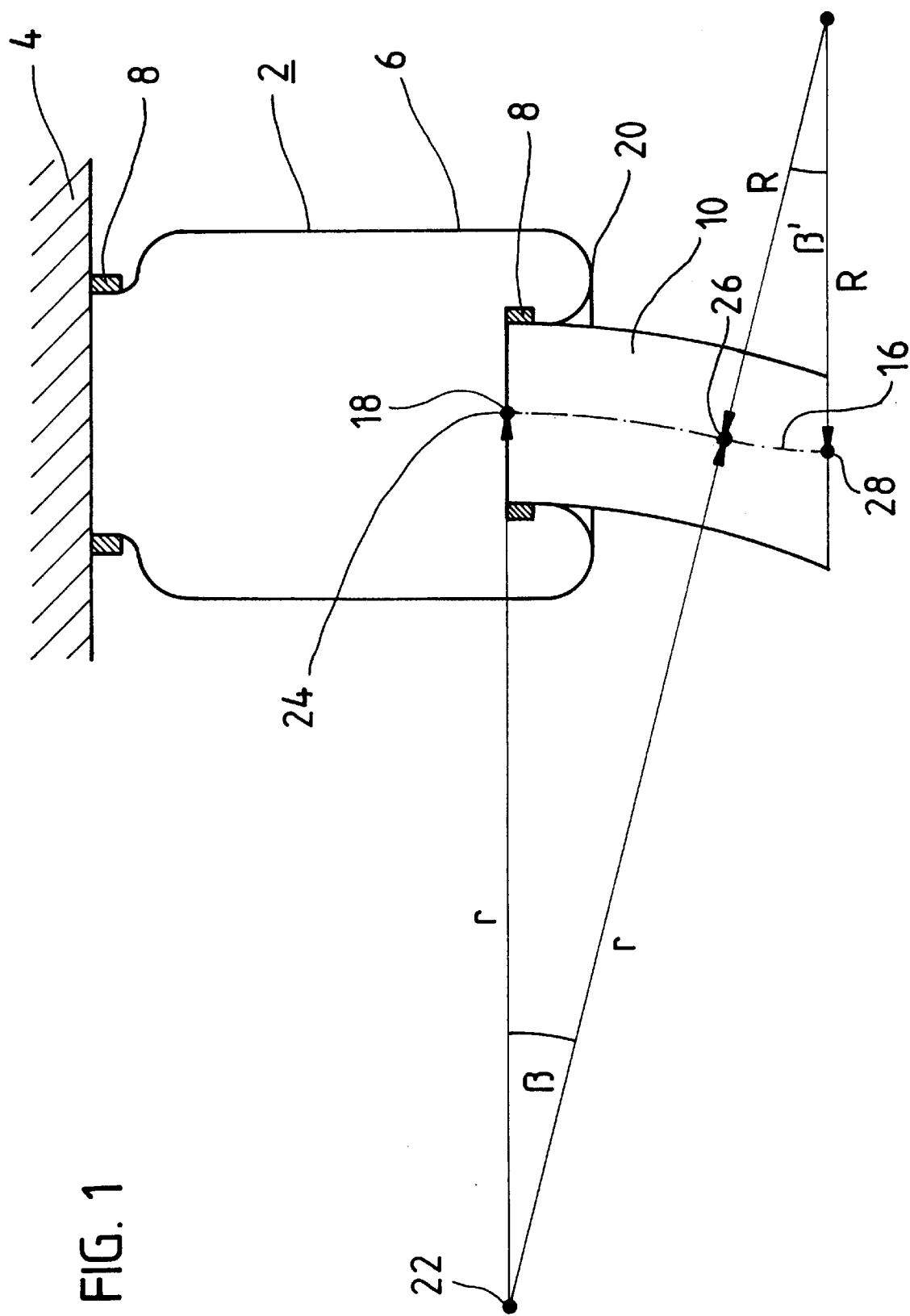
FIG. 1 is a first embodiment of the system of the invention incorporating an air spring flexible member and a rolloff piston.

FIG. 1 shows a system 2 which includes an air spring flexible member 6, which is clamped between a cover plate 4 and a rolloff piston 10, for example, with the aid of clamping rings 8.

The flexible member 6 surrounds a space closed off airtight to form an air spring. The rolloff piston 10 is arranged so as to be movable relative to the flexible member 6. The movement of the rolloff piston through a curved path 16 is pregiven. In the following, it will be explained what is meant with the formulation that the "movement of the rolloff piston is pregiven through a curved path".

In FIG. 1, the condition is shown, wherein the rolloff piston 10 is completely pulled out of the flexible member 6. In this condition, a fixed point 18 is defined which lies at the center of the rolling lobe 20 and defines the start point of the curved path 16. The curved path 16 defines a curvature radius (r) at point 18 and this curvature radius (r) defines a pivot point 22. The curvature radius (r) is retained on the curved path 16 over the angle β. The point 24 of the rolloff piston 10 is coincident with the point 18 in the start position shown in FIG. 1 and is pivoted out of this start position through the circular segment rβ and the rolloff piston 10 plunges into the flexible member 6. The curved path 16 is taken along so that, after the circular segment rβ is passed through, the point 26 comes to lie in the point 18. From point 26 on, the curved path 16 has another curvature radius R which is retained over the angular range β'. When the point 26 comes to lie on the point 18 when plunging into the flexible member, then, for a further plunge of the rolloff piston 10 into the flexible member 6, the curved path 16 is taken along and the point 26 is moved on a circular path over an angular range β' having the radius R. Finally, with a complete plunge of the rolloff piston 10, the point 28 lies on the point 18.

The curved path 16 shown in FIG. 1 lies completely in the plane of the drawing but this is not necessarily so. Rather, the curved path 16 can have almost any shape. The course of the curved path 16 is exclusively determined from the way how the rolloff piston 10 is arranged relative to the flexible member 6 of the air spring. The movement of the rolloff piston is fixed by the curvature radius of the curved path 16 and by the angular range over which the curved path retains this curvature radius.

In the embodiment shown in FIG. 1, the rolloff piston 10 is curved, with the curvature of the rolloff piston 10 having, at least over a segment, the same orientation as the curvature of the curved path 16. This is the case between points 24 and 26 of the curved path 16 and in contrast thereto, the orientation of the curvature of the rolloff piston 10 between the points 26 and 28 is opposite to the orientation of the curvature of the curved path 16.

Figure 2:
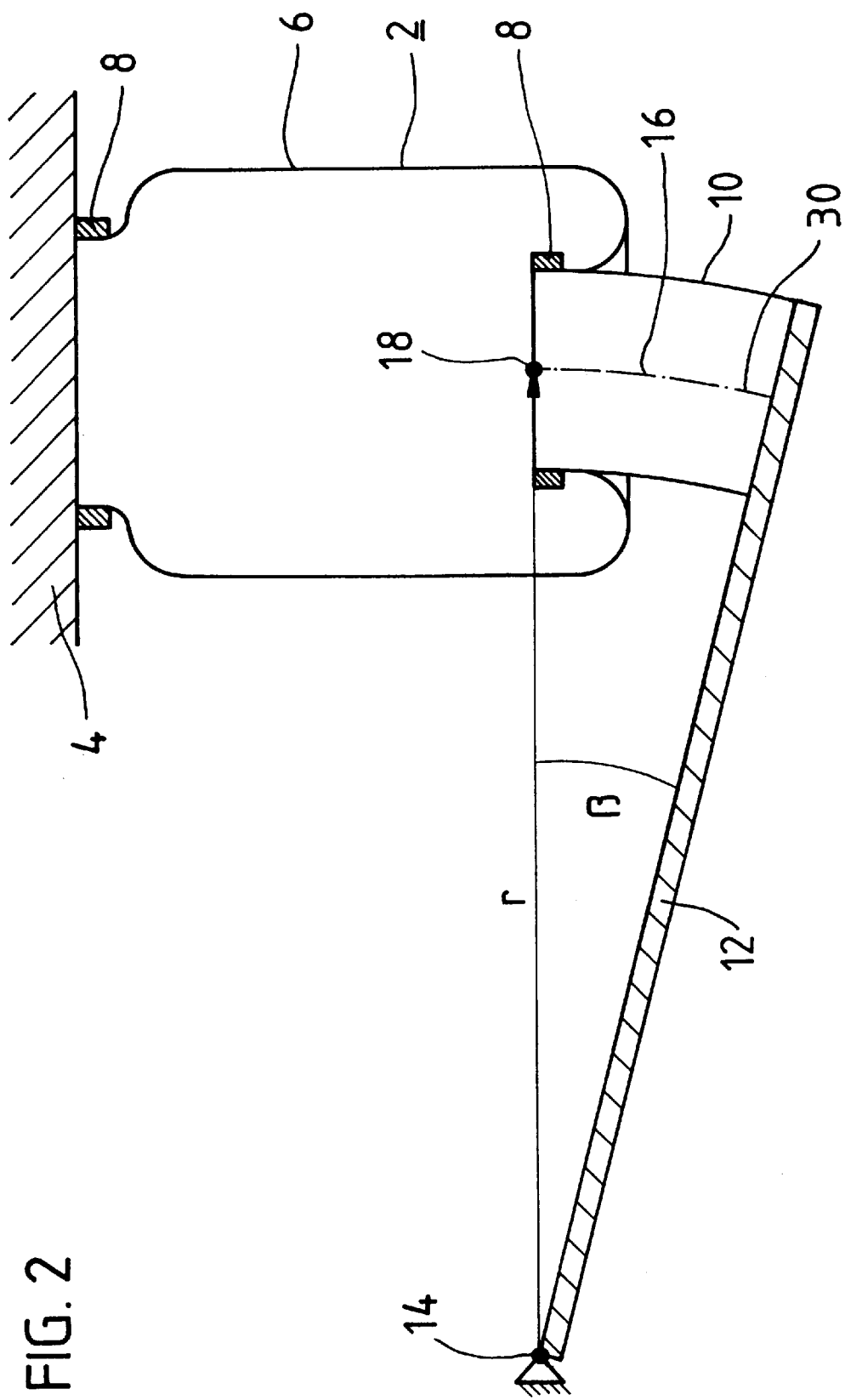
FIG. 2 is another embodiment of the system of the invention also incorporating an air spring flexible member and a rolloff piston; and, FIG. 3 is still another embodiment of the system of the invention incorporating an air spring flexible member and a rolloff piston.

FIG. 2 shows a system 2 including a flexible member which is clamped between a cover plate 4 and a rolloff piston 10, for example, with the aid of clamping rings 8. The rolloff piston 10 is attached to an element 12, for example, a longitudinal swing rod. The element is pivotally journalled in an attachment point 14. In the embodiment shown in FIG. 2, the rotational axis is perpendicular to the plane of the drawing and passes through point 14.

FIG. 2 shows the system in the condition wherein the rolloff piston 10 is pulled entirely out of the flexible member 6 of the air spring. In this state, the curved path 16 has a curvature radius (r) at point 18, which is pregiven by the spacing between the point 14 and the point 18. The curved path 16 has this curvature radius (r) over the entire angular range β. The rolloff piston 10 moves relative to the flexible member 6; that is, a circular path segment, which is pregiven by the radius (r) and by the angle β.

In the embodiment shown in FIG. 2, the rolloff piston is so configured that the center curvature line 30 of the rolloff piston 10 corresponds to the curved path 16 of the rolloff piston.

Figure 3:
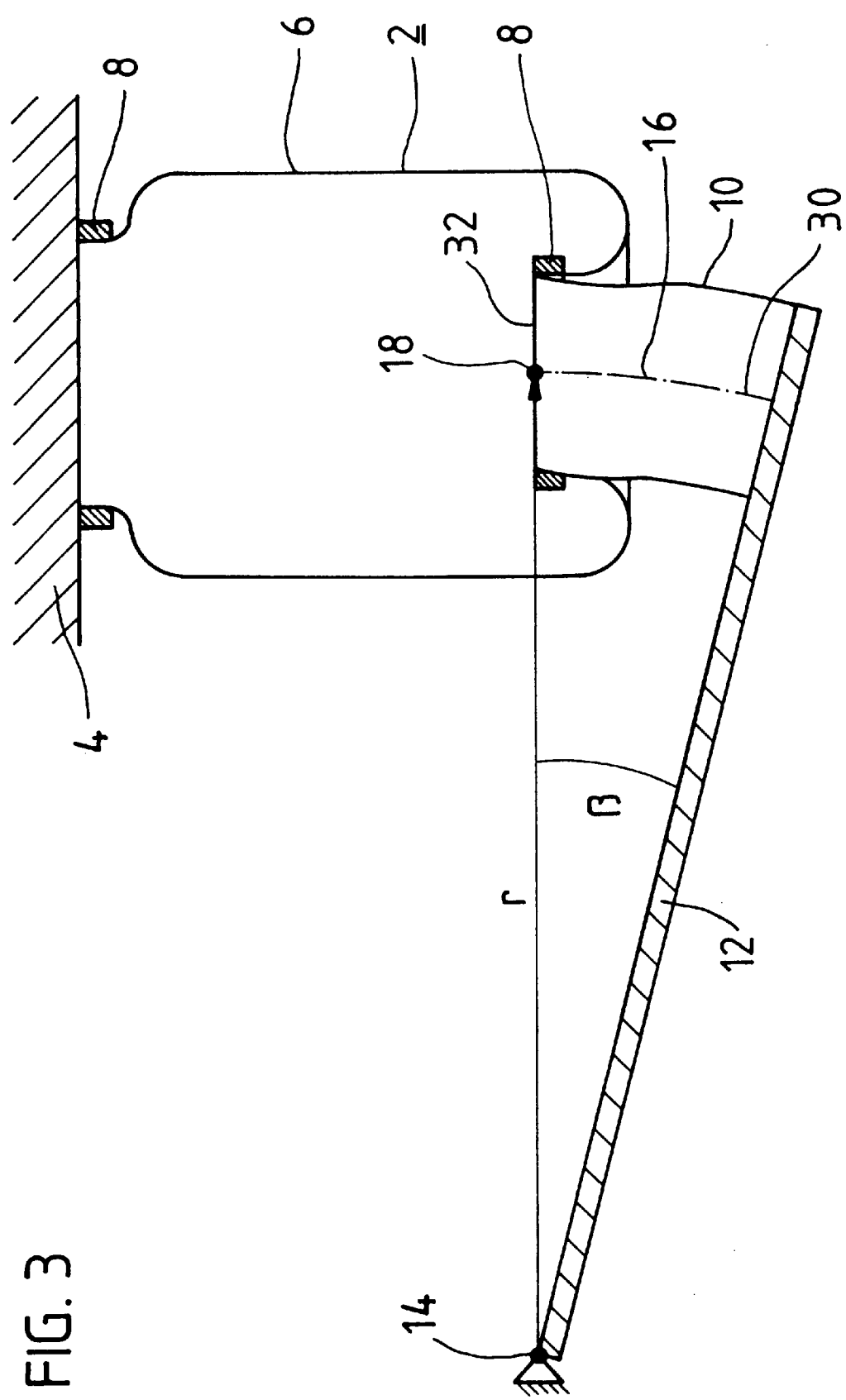

FIG. 3 shows a system 2 which is substantially configured the same way as the system of FIG. 2. The only difference is that the rolloff piston 10 has a curvature at the end 32 facing toward the cover plate 4 which has an orientation opposite to the orientation of the curved path 16 in the start range. When the rolloff piston 10 shown in FIG. 3 plunges into the flexible member 6 as pregiven by the curved path 16, then a contact between the rolloff piston 10 and the flexible member 6 does not happen as quickly as in the system shown in FIG. 2. In this way, free path advantages are achieved with the configuration of the rolloff piston 10 according to FIG. 3.

It is understood that the foregoing description is that of the preferred embodiments of the invention and that various changes and modifications may be made thereto without departing from the spirit and scope of the invention as defined in the appended claims.

What is claimed is:

1. An air spring system comprising:

a flexible member;

a cover plate;

a rolloff piston;

clamping means for clamping said flexible member between said cover plate and said rolloff piston;

means for moving said rolloff piston relative to said plate through a pregiven curved path so as to cause said flexible member to form a rolling lobe as said flexible member rolls up and down on said rolloff piston;

said rolloff piston being curved so as to have a curvature which has the same orientation as the curvature of said oath at least over a segment thereof;

said curved path having a start segment and said curved path having a specific curvature along said start segment;

said rolloff piston having an end portion facing toward said cover plate; and, said curvature of said rolloff piston at said end portion being significantly less than said specific curvature of said curved path.

2. The air spring system of claim 1, said rolloff piston having a center line of curvature and said center line having a radius of curvature at least over a segment thereof corresponding to the radius of curvature of said curved path.

3. The air spring system of claim 1, said curvature of said rolloff piston at said end portion being opposite to said specific curvature.

4. A rolloff piston mounted so as to be movable relative to the flexible member of an air spring and the movement of said rolloff piston being pregiven over a curved path so as to cause said flexible member to form a rolling lobe as said flexible member rolls up and down on said rolloff piston, said rolloff piston comprising:

said rolloff piston being curved to have a curvature of the same orientation as the curvature of said curved path at least over a segment thereof;

said air spring including a cover plate and clamping means for clamping said flexible member between said cover plate and said rolloff piston;

said curved path having a start segment and said curved path having a specific curvature along said start segment;

said rolloff piston having an end portion facing toward said cover plate; and, said curvature of said rolloff piston at said end portion being significantly less than said specific curvature of said curved path.

5. The rolloff piston of claim 4, said rolloff piston having a center line of curvature and said center line having a radius of curvature at least over a segment thereof corresponding to the radius of curvature of said curved path.

6. The air spring of claim 4, said curvature of said rolloff piston at said end portion being opposite to said specific curvature.

* * * * *

UNITED STATES PATENT AND TRADEMARK OFFICE
CERTIFICATE OF CORRECTION

PATENT NO. : 6,173,946 B1
DATED : January 16, 2001
INVENTOR(S) : Stefan Wode, Gerhard Thurow, Bernhard Kirsten and Joachim Jeischik It is certified that error appears in the above-identified patent and that said Letters Patent is hereby corrected as shown below:

<u>Column 4,</u>
Line 50, delete "oath" and substitute -- path -- therefor.

Signed and Sealed this

Second Day of April, 2002

Attest:

Attesting Officer

JAMES E. ROGAN
Director of the United States Patent and Trademark Office